United States Patent
Momtahan

(10) Patent No.: US 9,104,268 B2
(45) Date of Patent: Aug. 11, 2015

(54) COMPACT OPTICAL FINGER NAVIGATION SYSTEM WITH ILLUMINATION VIA REDIRECTION SURFACE HOLES

(75) Inventor: Omid Momtahan, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1166 days.

(21) Appl. No.: 13/020,742

(22) Filed: Feb. 3, 2011

(65) Prior Publication Data
US 2012/0199728 A1 Aug. 9, 2012

(51) Int. Cl.
*G06F 3/042* (2006.01)
*G06F 3/0354* (2013.01)

(52) U.S. Cl.
CPC ............ *G06F 3/042* (2013.01); *G06F 3/03547* (2013.01); *G06F 3/0421* (2013.01); *G06F 2203/04109* (2013.01)

(58) Field of Classification Search
CPC ... G06F 3/042; G06F 3/0421; G06F 3/03547; G06F 2203/04109
USPC ..................... 250/221, 559.11; 345/166, 173, 345/175–176; 382/124
See application file for complete search history.

(56) References Cited

U.S. PATENT DOCUMENTS

| | | | |
|---|---|---|---|
| 6,677,929 B2 | 1/2004 | Gordon et al. | |
| 6,872,931 B2 | 3/2005 | Liess et al. | |
| 7,148,466 B2 | 12/2006 | Eckman et al. | |
| 7,158,659 B2 | 1/2007 | Baharav et al. | |
| 7,313,255 B2 | 12/2007 | Machida et al. | |
| 8,400,408 B2 * | 3/2013 | Hotelling et al. | 345/173 |
| 2007/0291164 A1 | 12/2007 | Goh et al. | |
| 2009/0201594 A1 | 8/2009 | Smith | |
| 2010/0078545 A1 * | 4/2010 | Leong et al. | 250/221 |
| 2010/0079408 A1 * | 4/2010 | Leong et al. | 345/175 |
| 2010/0207011 A1 | 8/2010 | Smith | |
| 2010/0289775 A1 * | 11/2010 | Lee et al. | 345/176 |
| 2011/0147102 A1 * | 6/2011 | Song et al. | 178/18.09 |
| 2012/0026093 A1 * | 2/2012 | Duparre et al. | 345/166 |
| 2012/0146948 A1 * | 6/2012 | Tong et al. | 345/175 |
| 2012/0182264 A1 * | 7/2012 | Lee et al. | 345/175 |
| 2013/0063399 A1 * | 3/2013 | Noro et al. | 345/175 |

FOREIGN PATENT DOCUMENTS

WO WO 2010081652 A1 * 7/2010 ............ G06F 3/042

* cited by examiner

*Primary Examiner* — Georgia Y Epps
*Assistant Examiner* — Kevin Wyatt

(57) ABSTRACT

An optical finger navigation device includes a navigation cover. The navigation cover includes a tracking surface and an illumination surface. The tracking surface exhibits a first light reflection characteristic in a presence of a navigation object at the tracking surface and a second light reflection characteristic in an absence of the navigation object at the tracking surface. A light source generates illumination directed toward the illumination surface of the navigation cover. A redirection structure is interposed between the light source and the illumination surface of the navigation cover. A reflection surface of the first redirection structure is approximately facing the illumination surface of the navigation cover. An illumination surface of the redirection structure is approximately facing the light source. The redirection structure defines at least one hole therethrough to pass light generated by the light source toward the illumination surface of the navigation cover.

20 Claims, 7 Drawing Sheets

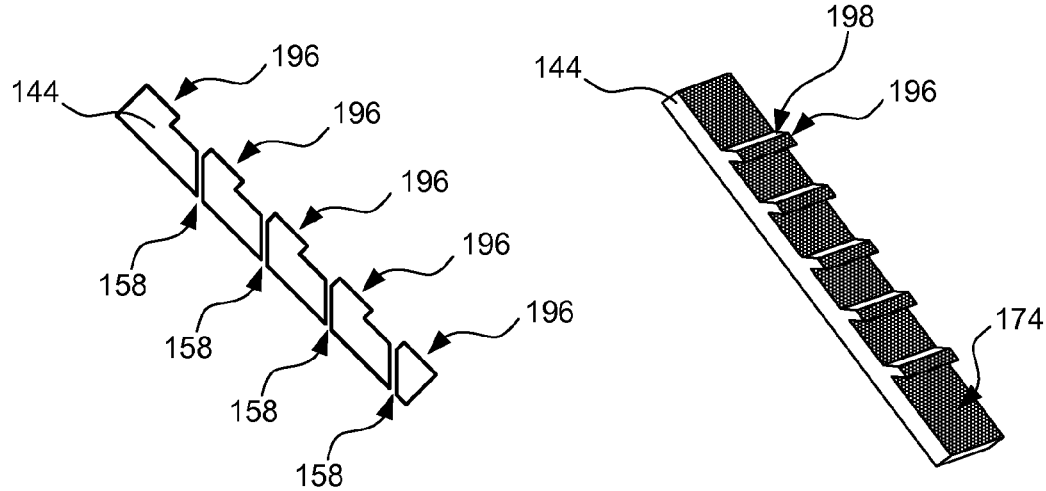
FIG. 10A
FIG. 10B
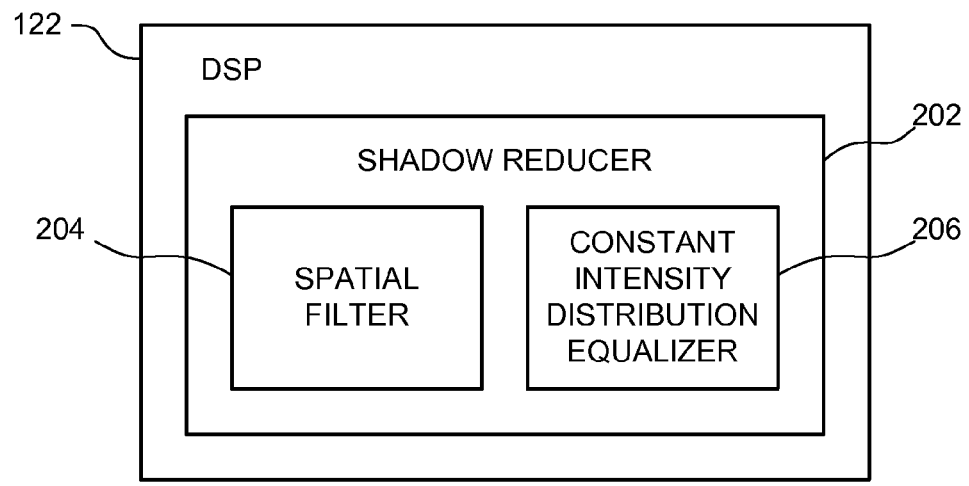
FIG. 11

COMPACT OPTICAL FINGER NAVIGATION SYSTEM WITH ILLUMINATION VIA REDIRECTION SURFACE HOLES

BACKGROUND

Optical finger navigation (OFN) sensors are used to sense relative movement of a user's finger. OFN sensors are mainly implemented using small lenses or optical imaging systems (lenses, prisms, and apertures). The current trend is to implement OFN sensors within devices that have relatively small form factors. However, the use of a small form factor results in design difficulties. For example, the requirements on the physical dimensions of the imaging system as a whole limit the overall size of the OFN sensors.

As the size of OFN devices becomes smaller and smaller, it is harder to design efficient imaging and illumination optics. Also, the integration of these two optical subsystems (e.g., imaging and illumination) becomes more difficult. The direct optical path for the illumination is either not present or would be positioned in a way that results in steep angles inside the transparent cover of the device. Total internal reflection (TIR) inside the navigation cover of the OFN device could limit the amount of light delivered to the navigation surface in such cases.

SUMMARY

Embodiments of an apparatus are described. In one embodiment, the apparatus is an optical finger navigation (OFN) device. An embodiment of the OFN device includes a navigation cover, a light source, and a redirection surface. The navigation cover includes a tracking surface and an illumination surface. The tracking surface exhibits a first light reflection characteristic in a presence of a navigation object at the tracking surface and a second light reflection characteristic in an absence of the navigation object at the tracking surface. A light source generates illumination directed toward the illumination surface of the navigation cover. A redirection structure is interposed between the light source and the illumination surface of the navigation cover. A reflection surface of the first redirection structure is approximately facing the illumination surface of the navigation cover. An illumination surface of the redirection structure is approximately facing the light source. The redirection structure defines at least one hole therethrough to pass light generated by the light source toward the illumination surface of the navigation cover. Other embodiments of the apparatus are also described.

Embodiments of a method are also described. In one embodiment, the method is a method for operating an OFN device. An embodiment of the method includes generating light at a light source. The method also includes passing a portion of the light from the light source through a hole in a redirection structure to illuminate a tracking surface of a navigation cover. The tracking surface exhibits a first light reflection characteristic in a presence of a navigation object at the tracking surface and a second light reflection characteristic in an absence of the navigation object at the tracking surface. The method also includes reflecting light from the tracking surface back toward a reflection surface of the redirection structure. The reflection surface of the first redirection structure approximately faces the illumination surface of the navigation cover. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 10A depicts a schematic diagram of another embodiment of the first redirection structure of FIG. 2.

FIG. 10B depicts a schematic diagram of a perspective view of another embodiment of the first redirection structure of FIG. 2.

FIG. 11 depicts a schematic block diagram of one embodiment of the digital signal processor (DSP) of FIG. 1.

Throughout the description, similar reference numbers may be used to identify similar elements.

DETAILED DESCRIPTION

Figure 1:
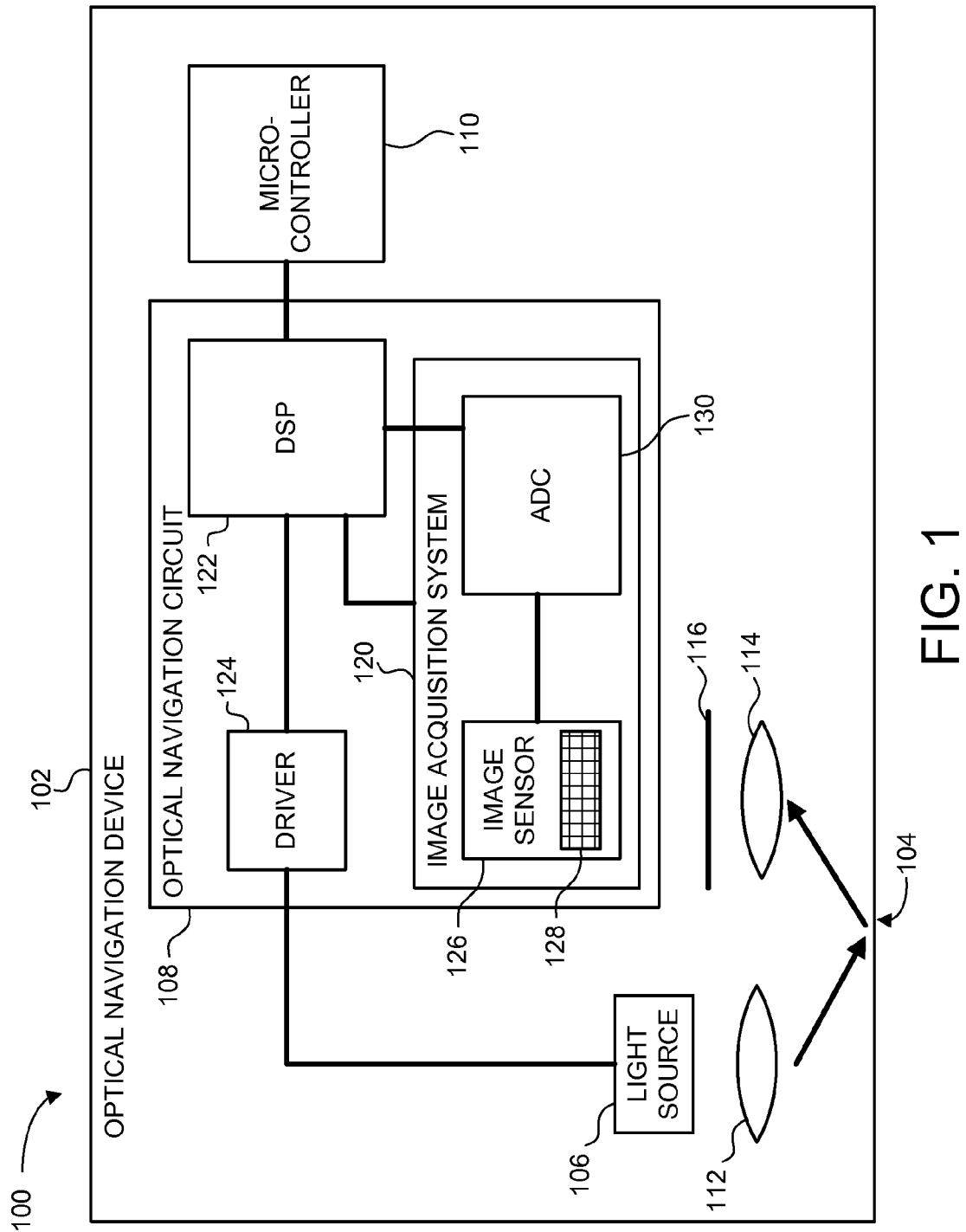
FIG. 1 depicts a schematic block diagram of an embodiment of an optical navigation system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments include a new arrangement and method to deliver illumination light to the navigation surface of an optical finger navigation (OFN) device. Specifically, illumination is delivered from a light source to the navigation surface via a relatively small hole through the back side of a mirror. At least some of the embodiments described herein are suitable for very thin OFN devices (e.g., with a thickness of less than about 3 millimeters) based on folded optics in which mirrors are used to guide the light from the navigation surface in the direction parallel to that surface for further processing and modifications.

A potential advantage of using a small hole in the mirror, as opposed to a partially reflective mirror, is the ability to control (i.e., block) the stray light which would otherwise be incident at the detector and cause the crosstalk. Particularly for a device implemented using a light emitting diode (LED) as a light source, the rays are propagating in a variety of directions. Using a partially reflective mirror with an LED light source would result in a condition where a large portion of the emitted light could find a direct path through a lens and the mirror to reach the detector, without reflecting at the navigation surface and, consequently, could cause crosstalk. By using a small hole or opening in mirror, the light from the light source cannot easily find a direct path to reach the detector. Thus, the potential crosstalk is prevented and/or considerably reduced.

FIG. 1 depicts a schematic block diagram of an embodiment of an optical navigation system 100. In general, the optical navigation system 100 is representative of one or more types of devices which are capable of implementing optical navigation functionality. As one example, the optical navigation system 100 may implement optical finger navigation functionality. Optical finger navigation functionality allows a user to move a finger on a navigation tracking surface in order to input information or control various aspects of a coupled device (e.g., to control a cursor on a display device). As another example, it may be possible to implement a version of the optical navigation system 100 to facilitate conventional mouse navigation functionality. Other embodiments of the optical navigation system 100 may implement other types of navigation functionality.

The illustrated optical navigation system 100 includes an optical navigation device 102 relative to a navigation surface 104. In some embodiments, the navigation surface 104 is coupled to the optical navigation device 102 so that movement of the optical navigation device 102 results in corresponding movement of the navigation surface 104. For example, a mobile telephone, personal digital assistant (PDA), or other computing device may have an integrated navigation surface 104 that is accessible on an exterior face of the device. In other embodiments, the navigation surface 104 is separate from the optical navigation device. For example, a desktop surface (or mousepad surface) may serve as the navigation surface 104 for an optical navigation device 102 implemented to perform conventional mouse navigation functionality.

In general, the optical navigation device 102 illuminates portions of the navigation surface 104 in order to generate images of the illuminated portions or features at the navigation surface 104. More specifically, the optical navigation device 102 illuminates relative movement at the navigation surface 104 and generates one or more navigation signals representative of the relative movement at the navigation surface 104. Hence, the navigation surface 104 also may be referred to as an illumination surface. Additionally, since the navigation surface 104 is used to track the movement of the optical navigation device 102, the navigation surface 104 also may be referred to as a tracking surface. In some embodiments, the relative movement is due to movement of a user's finger across the navigation surface 104. In other embodiment, the relative movement is due to movement of the optical navigation device 102 relative to a separate navigation surface 104 (e.g., desktop).

In order to illuminate the navigation surface 104, the optical navigation device 102 emits light which is at least partially reflected by the navigation surface 104. The optical navigation device 102 detects at least a portion of the reflected light and processes the detected portion to generate the navigation signals. Examples of how the navigation signals may be generated are described in more detail below.

The navigation surface 104 may be any type of surface and may include one or more types of material compositions. Examples of typical navigation surfaces 104 include transparent or semi-transparent plastic or glass, wood, stone, or plastic laminate desktops, as well as fabric or other textured navigation pads (e.g., a mouse pad), skin, or cloth.

In the arrangement where the navigation surface 104 is separate from the optical navigation device 102, the distance between the optical navigation device 102 and the navigation surface 104 may vary depending on the application for which the optical navigation device 102 is used. In surface navigation applications, the optical navigation device 102 may be relatively close to the navigation surface 104. For example, a housing of the optical navigation device 102 may be in direct, physical contact with the navigation surface 104. Alternatively, stand-off structures (not shown) attached to the housing of the optical navigation device 102 may be in direct, physical contact with the navigation surface 104. In other embodiments, the optical navigation device 102 may be within a few centimeters or inches of the navigation surface 104, without being in direct, physical contact with the navigation surface 104. In contrast, in free space navigation applications, the optical navigation device 102 may be relatively far from the navigation surface 104. For example, the optical navigation device 102 may operate outside of the surface navigation optical range.

The depicted optical navigation device 102 includes a light source 106, an optical navigation circuit 108, and a microcontroller 110. The optical navigation device 102 also includes optical elements 112 and 114, and a mask or filter 116. Other embodiments may include fewer or more components. For example, some embodiments of the optical navigation device 102 may exclude one or more of the optical elements 112 and 114, while other embodiments include additional optical elements. In another embodiment, a single optical element may be used for optical control in both the illumination and imaging light paths. As other examples, some embodiments of the optical navigation device 102 may exclude the mask or filter 116, or may include multiple masks or filters.

In one embodiment, the light source 106 is an incoherent light source. In another embodiment, the light source 106 is a coherent light source. In one embodiment, the light source 106 is a laser. For example, the light source 106 may be a vertical cavity surface emitting laser (VCSEL) or a light emitting diode (LED). Alternatively, the light source 106 may be another type of laser or other light source. In some embodiments, the light emitted by the light source 106 is collimated. In other embodiments, the light source 106 emits light that is not collimated.

In general, the light source 106 directs light toward the navigation surface 104 to illuminate a portion of the navigation surface 104. The incident light (i.e., the light traveling toward the navigation surface 104) may pass through the optical element 112. Similarly, the reflected light beam (i.e., the light reflected from the navigation surface 104) may pass through the optical element 114. Additionally, the light from the optical element 114 passes through the mask or the filter 116. Specific functionality of the optical elements 112 and 114 and the mask 116 is described in more detail below.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light beam that is emitted toward the navigation surface 104. At least some of the light at the navigation surface 104 is reflected back into the optical navigation device 102, for example, when a user's finger is near or in direct physical contact with the navigation surface 104.

In some embodiments, the optical navigation device 102 includes an optical element 114. The optical element 114 produces an optical effect on the light. The depicted image acquisition system 120 includes an image sensor 126 and an analog-to-digital converter (ADC) 130. The image sensor 126 includes a pixel array 128 of distinct photosensors, or photodetectors. Each photosensor is referred to as a picture element (pixel). As an example, the image sensor 126 may include a 16×16 or 32×32 array of distinct photodetectors configured to detect light that is reflected from the navigation surface 104. However, the image sensor 126 does not need to be an array organized by a power of two.

In one embodiment, the image sensor 126 generates a plurality of electrical signals corresponding to light intensity of the reflected light at the pixel array 128. Each of the electrical signals corresponds to one of the picture elements (or pixels) of the pixel array 128. At least a portion of the light beam reflected from the navigation surface 104 is incident on the pixel array 128. Under certain conditions, the reflected light forms a speckle pattern at the pixel array 128. The average size of the speckles depends in part on the length of the optical path between the navigation surface 104 and the pixel array 128.

Image information is captured by the pixel array 128 of the image sensor 126 in sensor-specific frames. A frame of image information includes a set of simultaneously captured values for each distinct photosensor in the pixel array 128. Image frames captured by the pixel array 128 include data that represents features on the navigation surface 104. The rate of image frame capture and tracking resolution can be programmable.

The analog-to-digital converter (ADC) 130 converts the plurality of electrical signals, received from the pixel array 128 of the image sensor 126, from analog signals to digital signals (e.g., 8-bit digital values). The analog-to-digital converter 130 then passes the digital signals to the digital signal processor 122.

A tracking engine (not shown) within the digital signal processor 122 compares successive image frames from the pixel array 128 to determine the movement of image features between frames. In particular, the tracking engine determines movement by correlating common features that exist in successive image frames generated by the pixel array 128. The movement between image frames is expressed in terms of movement vectors in, for example, X and Y directions (e.g., $\Delta x$ and $\Delta y$). The movement vectors are then used to determine the relative movement at the tracking surface (e.g., the movement of a user's finger relative to the navigation surface 104 or, alternatively, the relative movement of the optical navigation device 102 relative to the navigation surface 104.

After the digital signal processor 122 receives the digital form of the electrical signals from the analog-to-digital converter 130 of the image acquisition system 120, the digital signal processor 122 may perform additional processing using the digital signals. The digital signal processor 122 then transmits one or more signals to the microcontroller 110. Examples of types of signals transmitted from the digital signal processor 122 of the optical navigation circuit 108 to the microcontroller 110 include channel quadrature signals based on $\Delta x$ and $\Delta y$ relative displacement values. These signals, or other signals, may be indicative of a movement of the optical navigation device 102 relative to the navigation surface 104.

Alternatively, the quadrature or other signals may be indicative of a movement of the optical navigation device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

Figure 2:
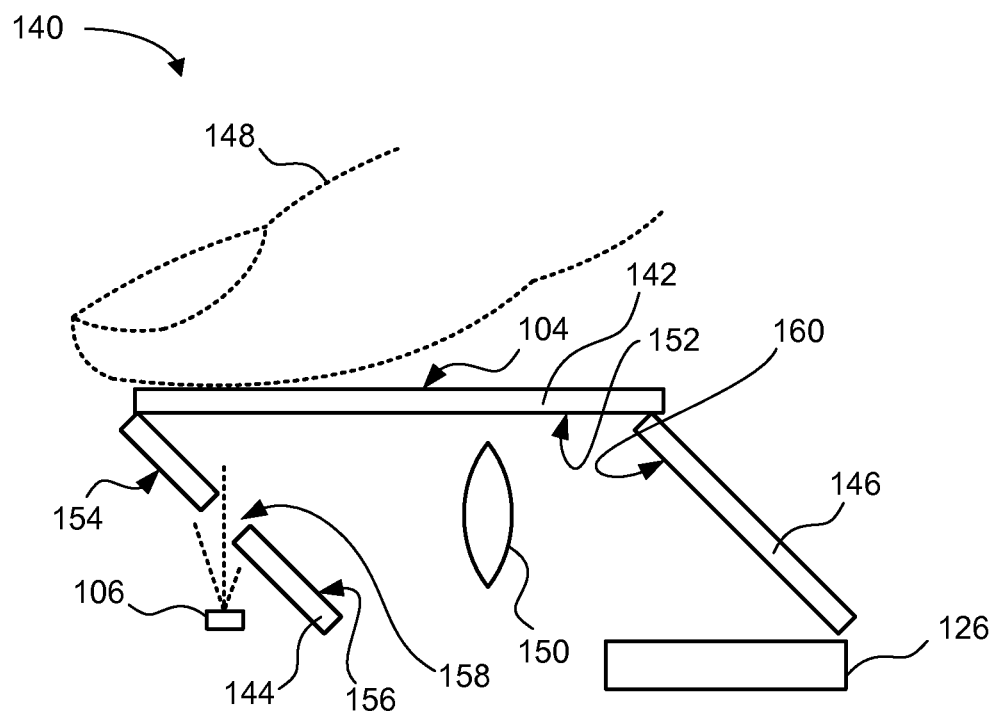
FIG. 2 depicts a schematic diagram of one embodiment of an optical navigation arrangement for use in the optical navigation system of FIG. 1.

FIG. 2 depicts a schematic diagram of one embodiment of an optical navigation arrangement 140 for use in the optical navigation system 100 of FIG. 1. The illustrated optical navigation arrangement 140 includes the light source 106, the tracking surface 104, and the image sensor 126. The tracking surface 104 is an exposed surface of a navigation cover 142 which substantially covers other components within the optical navigation arrangement 140. The optical navigation arrangement 140 also includes a first redirection structure 144 and a second redirection structure 146, which both facilitate directing light reflected from the tracking surface toward the image sensor 126. In some embodiments, the optical navigation arrangement 140 also includes an optical lens 150 interposed between the first and second redirection structures 144 and 146. Other embodiments of the optical navigation arrangement 140 may include fewer or more components.

The tracking surface 104 is a surface portion of the navigation cover 142. The tracking surface 104 may be a surface portion that is explicitly demarcated or implicitly identified by way of the installation of the navigation cover 142 with the optical navigation device 102. For reference purposes, the opposite (i.e., bottom) surface of the navigation cover 142 is designated as the illumination surface 152 of the navigation cover 142 because the illumination from the light source 106 is first incident on the illumination surface 152 before it is reflected at the tracking surface 104.

The tracking surface 104 exhibits different reflection characteristics depending on whether or not a navigation object (e.g., a user's finger 148) is present at the tracking surface 104. The term presence, in this instance, may encompass situations in which the navigation object is in direct, physical contact with the navigation surface 104, as well as situations in which the navigation object is within a detectable proximity of the navigation surface 104 such that a signal difference can be detected based on resulting images generated by the image sensor 126. If there is a navigation object present, then the tracking surface 104 exhibits a first light reflection characteristic to reflect a substantial amount of light at the tracking surface 104 back toward the first redirection structure 144. If a navigation object is not present, then the tracking surface 104 exhibits a second light reflection characteristic to reflect no light, or only a trivial amount of light, at the tracking surface back toward the first redirection structure 144.

The first redirection structure 144 and the second redirection structure 146 are at opposite ends of the optical navigation arrangement 140. In operation, the redirection structures 144 and 146 operate to redirect the light within the optical navigation arrangement 140 from the tracking surface 104 to the image sensor 126. The first redirection structure 144 includes an illumination surface 154 that is substantially facing the light source 106, and a reflection surface 156 that is substantially facing the illumination surface 152 of the navigation cover 142. The second redirection structure 146 also has a reflection surface 160 that is substantially facing the reflection surface 156 of the first redirection structure 144. The other side of the second redirection structure 146 is not given a corresponding designation and, in many embodiments, does not provide any specific functionality.

Figure 5:
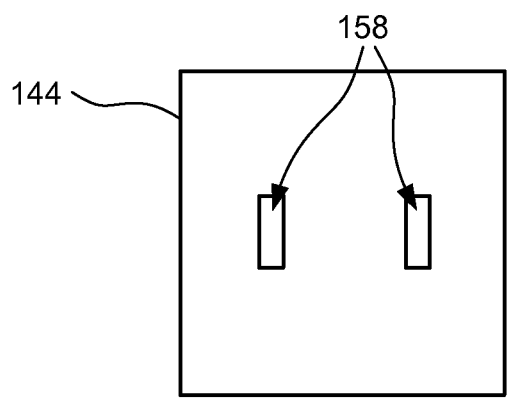
FIG. 5 depicts a schematic diagram of another embodiment of the first redirection structure of FIG. 2.

In operation, the light source 106 generates illumination (shown dashed) in the direction of the navigation surface 104. One or more holes 158 through the first redirection structure 144 allow some of the light generated by the light source 106 to pass through to illuminate the corresponding portion(s) of the navigation cover 142. Although not shown in FIG. 2, additional optical elements (e.g., lenses, mirrors, apertures, diffractive elements, etc.) may be used to make this light collimated, diverging, or converging, depending on the application, and to direct the light toward the holes with proper intensity distribution. Some examples of the first redirection structure 144 with one or more holes 158 are shown in FIGS. 3 and 5 and described in more detail below.

The light incident at the navigation surface 104 may be partially reflected and partially transmitted in the absence of a finger 148 or other object at the navigation surface 104. When a user's finger 148 or other navigation object is present at the navigation surface, a greater portion of the incident light is reflected and scattered back into optical element 142 toward the first redirection surface 144. The light is then partially or totally reflected at the reflection surface 156 of the first redirection structure 144 toward the reflection surface 160 of the second redirection structure 146 which, in turn, partially or totally reflects the light toward the pixel array 128 of the image sensor 126. In one embodiment, the light also passes through the optical element 150 interposed between the first and second redirection structures 144 and 146. It should be noted that the arrangement of the illustrated components is merely a depiction of one example, and other embodiments may use different arrangements of the same or similar components.

The size of the optical navigation arrangement 140 may vary in different embodiments. In one embodiment, the total distance from approximately the top of the light source 106 to the tracking surface 104 of the navigation cover 142 is about 1 millimeter. In another embodiment, that distance is less than about 2.5 millimeters. In other embodiments, that distance is between about 0.5 millimeters to about 3 millimeters. Furthermore, in some embodiments, the distance from the top of the light source 106 to a plane of the reflection surface 156 of the first redirection structure 144 is about 200 micrometers. In another embodiment, that distance is less than about 500 micrometers. In other embodiments, that distance is between about 50 micrometers to about 1.0 millimeter. Other embodiments of the optical navigation arrangement 140 may have different dimensions.

Figure 3:
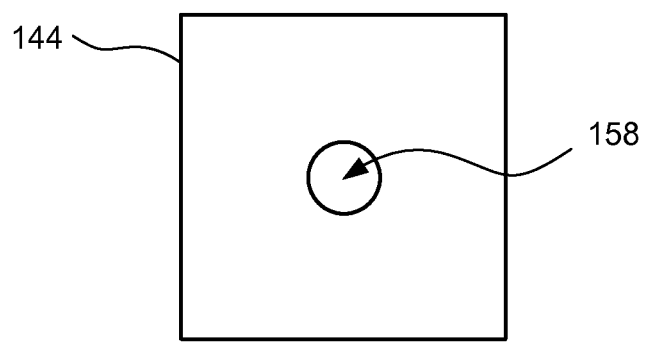
FIG. 3 depicts a schematic diagram of one embodiment of the first redirection structure of FIG. 2.

FIG. 3 depicts a schematic diagram of one embodiment of the first redirection structure 144 of FIG. 2. In the illustrated embodiment, the first redirection structure 144 has a single hole 158 that is centrally located within the geometry of the structure. Other embodiments may locate the hole 158 in a different location, symmetrically or asymmetrical disposed relative to the geometry of the structure. Other embodiments may include more than one hole 158.

Figure 4:
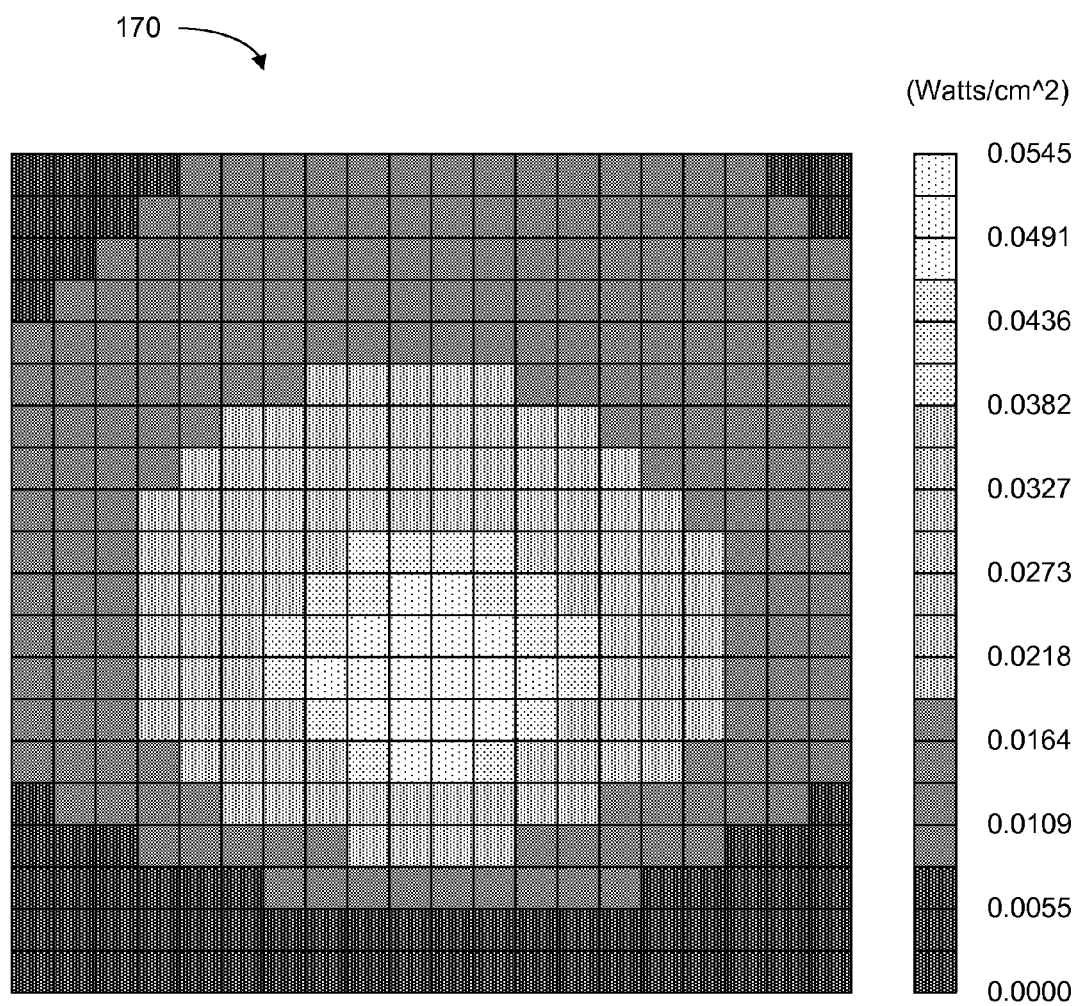
FIG. 4 depicts a graphical diagram of one embodiment of incoherent irradiance of a detector image at the tracking surface using an optical navigation arrangement as shown in FIG. 2.

FIG. 4 depicts a graphical diagram 170 of one embodiment of incoherent irradiance of a detector image using the optical navigation arrangement 140 as shown in FIG. 2. The depicted light distribution is achieved by a relatively small, circular hole (100 micrometer radius) approximately in the middle of the first redirection structure 144. The light source 106 is a light emitting diode (LED) that consumes approximately 25 milliwatts. The LED is mounted so that the top of the active area of the LED is positioned approximately 160 micrometers below the hole 158. As illustrated, the calculated irradiance various between about 0 to 0.0545 Watts per square centimeter. The total array size is approximately 1 square millimeter and has 400 pixels (20 by 20). For at least one embodiment, the peak calculated irradiance is 0.0545 Watts per square centimeter, and the total power is approximately 0.16241 milliwatts. In other embodiments, these numbers could be approximately scaled by the total illumination of the light source 106.

FIG. 5 depicts a schematic diagram of another embodiment of the first redirection structure 144 of FIG. 2. In contrast to the first redirection structure 144 shown in FIG. 3, the first redirection structure 144 shown in FIG. 5 includes multiple holes 148. Also, the holes are rectangular in shape, rather than circular. Other embodiments may include varying combinations of sizes and quantities of holes 158.

Figure 6:
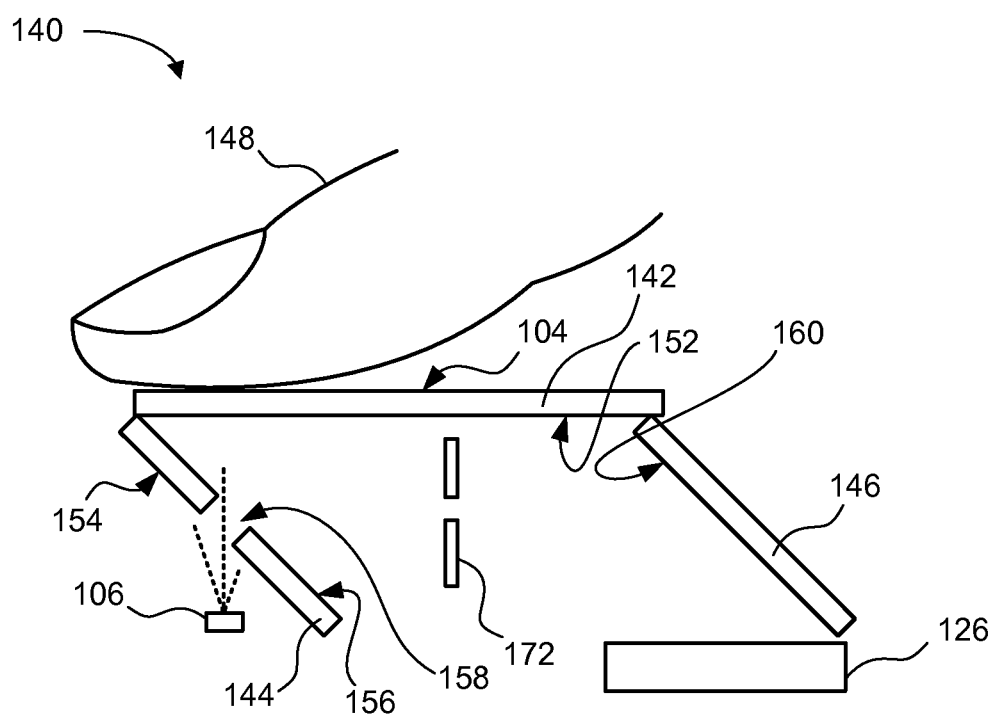
FIG. 6 depicts a schematic diagram of another embodiment of an optical navigation arrangement for use in the optical navigation system of FIG. 1.

FIG. 6 depicts a schematic diagram of another embodiment of an optical navigation arrangement 140 for use in the optical navigation system 100 of FIG. 1. In contrast to the optical navigation arrangement 140 shown in FIG. 2 and described above, the optical navigation arrangement shown in FIG. 6 includes an aperture stop 172, instead of the optical element 150. The aperture stop 172 has a hole to pass some of the light, while blocking another portion of the light. In one embodiment, the aperture stop blocks a perimeter portion of the light.

Other embodiments may include a combination of one or more optical elements 150 and one or more aperture stops 172.

Figures 7, 8:
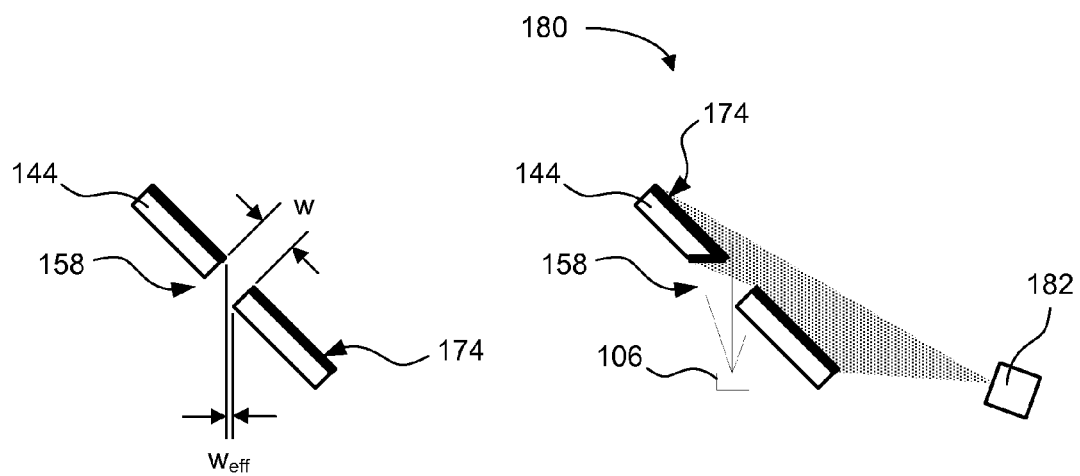
FIG. 7 depicts a schematic diagram of another embodiment of the first redirection structure of FIG. 2.
FIG. 8 depicts a schematic diagram of one embodiment of an application arrangement to directionally apply a metallization layer to an embodiment of the first redirection structure of FIG. 2.

FIG. 7 depicts a schematic diagram of another embodiment of the first redirection structure 144 of FIG. 2. The illustrated redirection structure 144 includes a mirror surface 174 applied to the reflection surface 156 of the first redirection structure 144. In one embodiment, the mirror surface 174 is on a piece of molded plastic. The holes 158 are formed in the plastic part. In particular, the reflection surface 156 is metalized to form the mirror surface 174.

For reference, the actual width, w, and the lateral width (also referred to as the effective width), $w_{eff}$, are designated in FIG. 7. The actual width is measure substantially parallel to the reflection surface 156, and the effective width is measured substantially parallel to the navigation cover 142. The relationship between the actual width and the effective width depends, at least in part, on the angle of the first redirection structure 144 relative to the navigation cover 142.

In one embodiment, the holes 158 are small with lateral dimensions (i.e., $w_{eff}$) of between about 10 μm to 200 μm. In other embodiments, the lateral dimensions may be larger or smaller. For example, the dimensions of a hole 158 with an elongated geometry may be less than about 10 μm in the shorter dimension and more than about 200 μm in the longer dimension.

FIG. 8 depicts a schematic diagram of one embodiment of an application arrangement 180 to directionally apply a metallization layer 174 to an embodiment of the first redirection structure 144 of FIG. 2. The illustrated arrangement 180 includes an applicator 182 which applies the metallization layer 174 to the reflection surface 156 of the first redirection structure 144. The metallization layer 174 could be formed, for example, by a thin metallic layer or several very thin dielectric layers. The metallic layer or the metal coating could be added using sputter coating or by vacuum deposition coating or by another similar technique. Different metals such as gold, silver, aluminum, or another similar metal could be used, or multiple metals could be used in combination. Multilayer dielectric structures could be formed using different thin film deposition techniques (e.g., chemical or physical deposition).

By controlling the direction of metal deposition on the reflection surface 156, the metallization material may be selectively applied to one or more walls of the hole 158. The first redirection structure 144 may be disposed within the optical navigation arrangement 140 to selectively expose the covered or uncovered portions to the reflected light from the tracking surface 104. This allows the design to be customized so as to control which surfaces might reflect light in stray or unwanted directions.

Figure 9:
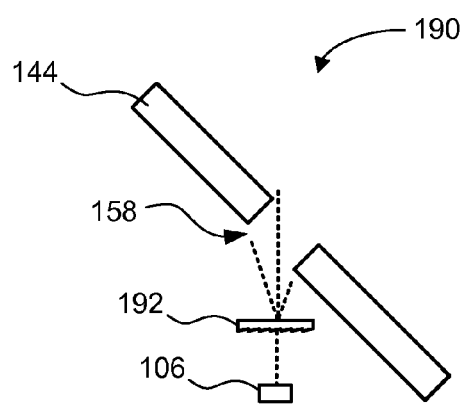
FIG. 9 depicts a schematic diagram of one embodiment of an optical arrangement of a diffuser for use in combination with a laser light source and the first redirection structure of FIG. 2.

FIG. 9 depicts a schematic diagram of one embodiment of an optical arrangement 190 of a diffuser 192 for use in combination with a laser light source 106 and the first redirection structure 144 of FIG. 2. In the case of the laser light source 106, a small diffusing surface 192 at or close to the location of the hole 158 with specific scattering parameters could be used to obtain more uniform illumination on the navigation surface. The scattered light, after passing through the diffuser 192, could have a Lambertian distribution or a Gaussian distribution, depending on the design of the diffuser. Since the diffusing surface 192 could be positioned relatively close to the tracking surface, the speckles that might form on the tracking surface 104 will have very small size and will not negatively affect the quality of the images formed on the image sensor 126. In other words, such small speckles are not visible by the optical navigation device 102.

FIG. 10A depicts a schematic diagram of another embodiment of the first redirection structure 144 of FIG. 2. The illustrated structure 144 includes multiple holes 158 that are formed with angled sidewalls, relative to the standard dimensions of the structure 144 itself. By angling the sidewalls of the holes 158, the effective width may be the same or substantially the same as the actual width of the holes 158.

The illustrated structure 144 also includes several non-planar features 196 on the reflection surface 156. In some embodiments, the placement of these non-planar features limits the amount of stray light that might accidentally reflect toward the second redirection structure 146 as the light travels from the light source 106 toward the tracking surface 104. The specific shape and/or size and/or quantity of non-planar features can be determined based on specific designs, shapes, sizes, and/or mounting characteristics of the first redirection structure 144. Another method of implementing this or any other similar arrangement is to have a solid structure 144 and form the holes only on the surface by masking some areas and not allowing the metal deposition to form over those areas.

FIG. 10B depicts a schematic diagram of a perspective view of another embodiment of the first redirection structure 144 of FIG. 2. The illustrated structure 144 includes multiple non-planar features 196, similar to the embodiment shown in FIG. 10A. A metallization layer 174 (or other reflective layer) is disposed on substantially all of the reflection surface 156 of the structure 144, except for certain portions of the non-planar features 196. By forming the structure 144 out of a material (e.g., glass, plastic, etc.) that is essentially transparent for a given wavelength or range of wavelengths, the areas that are not covered by the metallization layer 174 function similar to the holes 158 shown in the embodiment of FIG. 10A. In this way, the use of selective metal deposition techniques on a transparent material may define transparent "holes" or sections of the structure 144. In some embodiments, the bottom surface of the structure 144 may be aligned approximately parallel with the transparent top surfaces of the structure 144.

FIG. 11 depicts a schematic block diagram of one embodiment of the digital signal processor (DSP) 122 of FIG. 1. In some embodiments, the DSP 122 includes a shadow reducer 202. The shadow reducer 202 may be implemented, for example, by hardware elements that convey electrical signals, store software instructions, and/or process signals representative of image data.

The effect of the hole(s) 158 on the imaging part of the optical navigation system 100, including the image sensor 126, is minimal or relatively small because the light reflected from the finger 148 (or from the tracking surface 104, generally) is mostly diffused and scattered. Hence, the reflected light from the tracking surface 104 has relatively large angular components. A portion of the light in the angular cone of the beam from a few points on the tracking surface 104 might not be collected on the image sensor 126 due to the presence of the hole(s) 158. However, depending on the parameters of the imaging system (e.g., the numerical aperture) and the quantity and/or size of the hole(s) 158, the presence of one or more holes 158 in the first redirection structure 144 might result in partial or no shadowing effect in the images at the image sensor 126. Use of more holes 158 with smaller features (e.g., aperture area) may reduce any possible shadowing pattern at the image sensor 126.

Also, in the case of considerable shadowing, post processing of the data collected by the image sensor 126 could remove any negative effect of the shadowing on the navigation. For example, a spatial filter 204 may be used to perform spatial filtering of the images in the software to reduce the effect of the shadowing. As another example, the information of several images could be used by a constant intensity distribution equalizer 206 to equalize the constant intensity distribution present in the images and could eliminate the effect of shadowing. Other embodiments may implement other components to achieve shadow reduction use similar or different post processing techniques.

Figure 12:
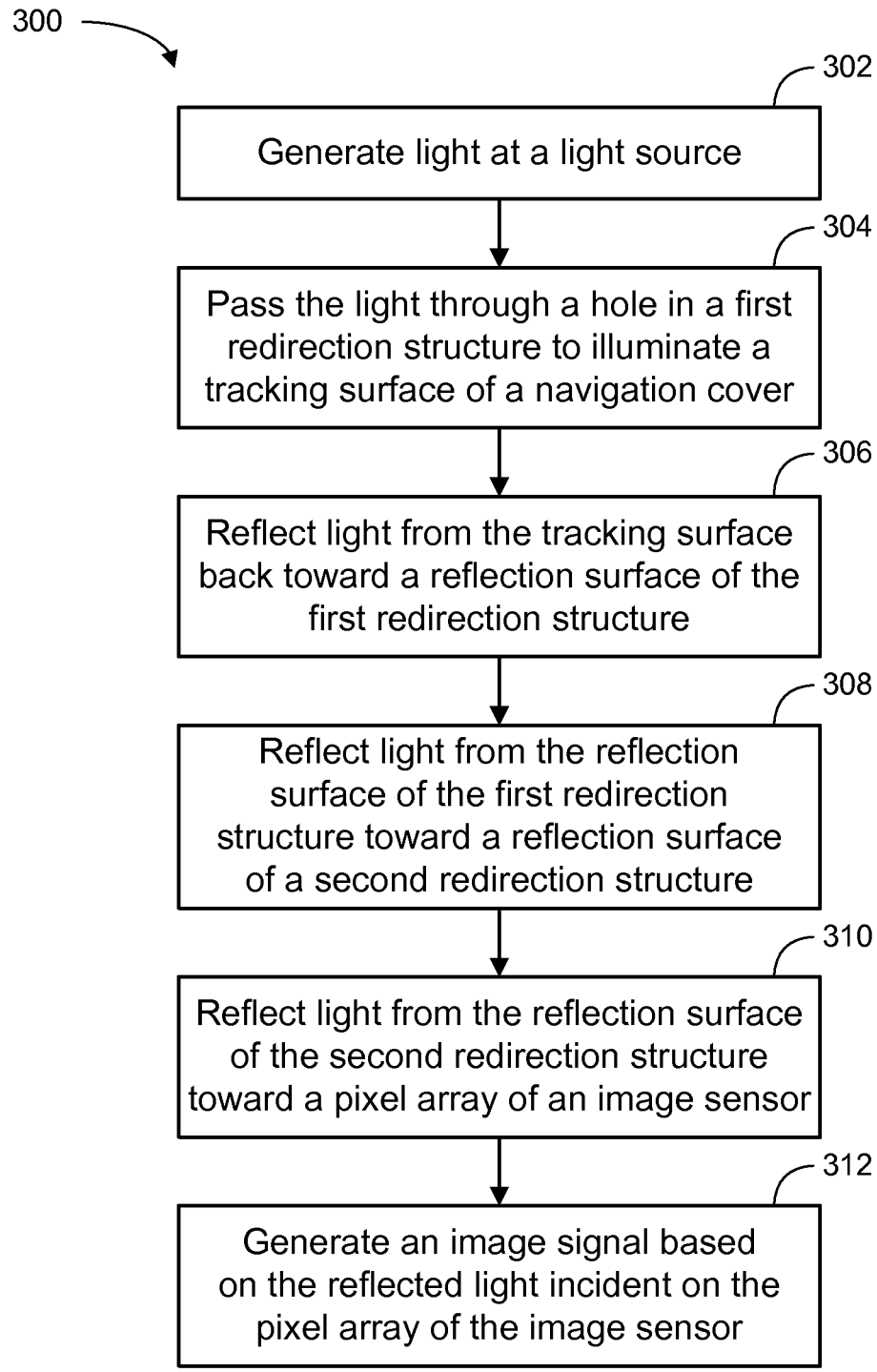
FIG. 12 depicts a flow chart diagram of one embodiment of a method for operating the optical navigation device of FIG. 1.

FIG. 12 depicts a flow chart diagram of one embodiment of a method 300 for operating the optical navigation device 102 of FIG. 1. Although the method 300 is described in conjunction with the optical navigation system 100 of FIG. 1, embodiments of the method 300 may be implemented with other types of optical navigation systems.

At block 302, the light source 106 generates light. At block 304, the light passes through the hole(s) 158 in the first redirection structure 144 to illuminate the tracking surface 104 of the navigation cover 142. At block 306, the light reflects from the tracking surface 104 back toward the reflection surface 156 of the first redirection structure 144. At block 308, the reflection surface 156 of the first redirection structure 144 reflects the light toward the reflection surface 160 of the second redirection structure 146. At block 310, the reflection surface 160 of the second redirection structure 146 reflects the light toward pixel array 128 of the image sensor 126. At block 312, the image sensor 126 generates an image signal based on the incident light. The depicted method 300 then ends.

It should also be noted that at least some of the operations for the methods may be implemented using software instructions stored on a computer useable storage medium or device for execution by a computer. As an example, an embodiment of a computer program product includes a computer useable storage medium or device to store a computer readable program that, when executed by a processor on a computer, causes the computer to perform operations described herein In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical finger navigation device comprising:
    a navigation cover which comprises a tracking surface and an illumination surface, wherein the tracking surface exhibits a first light reflection characteristic in a presence of a navigation object at the tracking surface and a second light reflection characteristic in an absence of the navigation object at the tracking surface;
    a light source to generate illumination directed toward the illumination surface of the navigation cover; and
    a first redirection structure interposed between the light source and the illumination surface of the navigation cover, wherein a reflection surface of the first redirection structure is approximately facing the illumination surface of the navigation cover, and an illumination surface of the first redirection structure is approximately facing the light source, wherein the first redirection structure defines at least one hole there through to pass light generated by the light source toward the illumination surface of the navigation cover;
    a second redirection structure located within a path of the light reflected by the reflection surface of the first redirection structure, wherein the second redirection structure comprises a reflection surface to redirect the light from the direction that is approximately parallel to the tracking surface; and
    an image sensor to receive the light reflected from the reflection surface of the second redirection structure, wherein the image sensor is approximately parallel to the navigation cover.

2. The optical finger navigation device of claim 1, wherein the reflection surface of the first redirection structure is configured to redirect light reflected from the tracking surface a direction that is approximately parallel to the tracking surface.

3. The optical finger navigation device of claim 2, further comprising an optical lens interposed between the first and second redirection structures, wherein the optical lens is configured to influence a path of the light reflected from the reflection surface of the first redirection structure towards the reflection surface of the second redirection structure.

4. The optical finger navigation device of claim 2, further comprising an aperture stop interposed between the first and second redirection structures, wherein the aperture stop is configured to block at least some of the light reflected from the reflection surface of the first redirection structure towards the reflection surface of the second redirection structure 5. The optical finger navigation device of claim 2, further comprising a processing device coupled to the image sensor, wherein the processing device is configured to perform post processing on an image signal from the image sensor to substantially remove a shadowing effect within the image signal due to a shadow within an illumination pattern of the light at the tracking surface, wherein the shadow results from a contrast between the light from the light source which passes through the hole in the first redirection surface and the light from the light source which is blocked by the first redirection surface.

6. The optical finger navigation device of claim 5, wherein the processing device is further configured to perform spatial filtering on a frame of pixel data from the image sensor to substantially remove the shadowing effect within the frame of pixel data due to the shadow within the illumination pattern of the light at the tracking surface.

7. The optical finger navigation device of claim 5, wherein the processing device is configured to equalize a constant intensity distribution over plurality of frames of pixel data from the image sensor to substantially remove the shadowing effect within the frame of pixel data due to the shadow within the illumination pattern of the light at the tracking surface.

8. The optical finger navigation device of claim 2, wherein the hole through the first redirection surface has an effective width, approximately parallel to the tracking surface, of between about 10 micrometers and 200 micrometers.

9. The optical finger navigation device of claim 1, further comprising an optical element disposed approximately within an optical path of the light from the light source through the hole in the first redirection structure, wherein the optical element is configured to diffuse the light from the light source before the light is incident on the illumination surface of the first redirection structure.

10. The optical finger navigation device of claim 1, wherein the first redirection structure comprises:
- a plastic molded piece with the hole defined therethrough; and
- a metallization layer disposed on at the reflection surface to form a mirror at the reflection surface of the first redirection structure.

11. The optical finger navigation device of claim 10, wherein the metallization layer is deposited at the reflection surface of the first redirection structure to cover only portions within an application field of view from an application direction, and an interior surface of the hole through the first redirection structure is substantially free from the metallization layer.

12. A method for operating an optical finger navigation device, the method comprising:
- generating light at a light source;
- passing a portion of the light from the light source through a hole in a first redirection structure to illuminate a tracking surface of a navigation cover, wherein the tracking surface exhibits a first light reflection characteristic in a presence of a navigation object at the tracking surface and a second light reflection characteristic in an absence of the navigation object at the tracking surface; and
- reflecting light from the tracking surface back toward a reflection surface of the first redirection structure, wherein the reflection surface of the first redirection structure approximately faces the illumination surface of the navigation cover;
- redirecting the light from the reflection surface of the first redirection structure at a reflection surface of a second redirection structure, wherein the reflection surface of the second redirection structure redirects the light toward an image sensor, wherein the image sensor is approximately parallel with the tracking surface of the navigation cover.

13. The method of claim 12, further comprising redirecting the light at the reflection surface of the first redirection structure in a direction that is approximately parallel to the tracking surface.

14. The method of claim 13, further comprising:
- generating an image signal at the image sensor, wherein the image signal is representative of a plurality of pixel values within an image frame;
- sending the image signal to a processing device; and
- spatially filtering the image signal to substantially remove a shadowing effect within the pixel values of the image frame.

15. The method of claim 13, further comprising:
- generating an image signal at the image sensor, wherein the image signal is representative of a plurality of pixel values within a plurality of image frames;
- sending the image signal to a processing device; and
- processing the image signal to equalize a constant intensity distribution of the image frames to substantially remove a shadowing effect within the pixel values of the image frames.

16. The method of claim 12, further comprising diffusing the light from the light source at approximately an optical element disposed within an optical path of the light from the light source through the hole in the first redirection structure.

17. The method of claim 12, further comprising an optical lens interposed between the first and second redirection structures, wherein the optical lens is configured to influence a path of the light reflected from the reflection surface of the first redirection structure towards the reflection surface of the second redirection structure.

18. The method of claim 12, further comprising an aperture stop interposed between the first and second redirection structures, wherein the aperture stop is configured to block at least some of the light reflected from the reflection surface of the first redirection structure towards the reflection surface of the second redirection structure.

19. An optical device comprising:
- a navigation cover which comprises a tracking surface and an illumination surface, wherein the tracking surface exhibits a first light reflection characteristic in a presence of a navigation object at the tracking surface and a second light reflection characteristic in an absence of the navigation object at the tracking surface;
- a light source to generate illumination directed toward the illumination surface of the navigation cover; and
- a first redirection structure interposed between the light source and the illumination surface of the navigation cover, wherein a reflection surface of the first redirection structure is approximately facing the illumination surface of the navigation cover, and an illumination surface of the first redirection structure is approximately facing the light source, wherein the first redirection structure defines at least one transparent section to pass light generated by the light source toward the illumination surface of the navigation cover, and wherein the first redirection structure further comprises a non-planar feature on the reflection surface, wherein the transparent section is on a face of the non-planar feature.

20. The optical device of claim 19, further comprising an optical lens interposed between the first and second redirection structures, wherein the optical lens is configured to influence a path of the light reflected from the reflection surface of the first redirection structure towards the reflection surface of the second redirection structure.

* * * * *